2,988,504
CLARIFICATION OF ACIDIC PHOSPHATIC SOLUTIONS

Robert C. Mazurek, Lakeland, Fla., assignor to International Minerals & Chemical Corporation, a corporation of New York
No Drawing. Filed Dec. 30, 1957, Ser. No. 705,749
14 Claims. (Cl. 210—53)

This invention relates to a process for the clarification of acidic phosphatic solutions. More particularly, the invention relates to a process for the efficient separation of suspended, solid impurities from solutions of inorganic, acidic phosphatic materials such as those formed by the aqueous leaching of acidulated phosphate rock.

Conventional methods for the production of aqueous solutions of inorganic, acidic phosphatic materials by leaching acidulated phosphate rock yield a crude product in which is suspended a substantial quantity of solid impurities which are not removed by standard filtration methods. Upon standing in storage or during shipment in tank cars or the like, such acidic phosphatic solutions deposit a layer of solid matter which renders handling of the stored or shipped acid exceedingly difficult and frequently economically infeasible.

The problems occasioned by suspended solid impurities are particularly acute with respect to wet process phosphoric acid. Conventional practice yields a crude wet process phosphoric acid containing only about 15% to 30% by weight of phosphorus pentoxide and a substantial portion of suspended solid impurities which do not readily settle. Such crude, dilute wet process acid is normally concentrated to increase the $P_2O_5$ content to at least about 45% to 50% by weight. The concentration procedure necessarily also serves proportionately to increase the quantity of suspended solid impurities and yields concentrated acid solutions frequently containing about 15% to about 30% by weight of suspended solids, which are particularly difficult to clarify.

In general, it has been determined that the impurities present in wet process acidic phosphatic solutions such as wet process phosphoric acid generally comprise calcium sulfate hemihydrate ($CaSO_4 \cdot \frac{1}{2}H_2O$), sodium and potassium silicofluoride, iron and aluminum phosphates and, in acidic solutions resulting from concentration or other procedures in which organic materials may be introduced in small amounts, double salts of iron and aluminum phosphates with phosphoric acids bearing organic substituents which may be hypothetically represented by the formula $RPO_4 \cdot 2H_3PO_4$, where "R" is an organic radical derived from the organic material employed in the production of the particular phosphatic solution treated.

It is apparent that the removal of suspended solid impurities from wet process phosphatic solutions as contemplated by this invention differs fundamentally from the defluorination of similar phosphatic solutions. The present invention, which only incidentally reduces the fluorine content of the acidic phosphatic solution treated, is applicable to remove suspended solids from either defluorinated or undefluorinated aqueous solutions of inorganic phosphates.

It is accordingly a primary object of this invention to provide a method for efficiently removing suspended solid impurities from acidic inorganic phosphate solutions.

It is a further important object of the invention to provide a method effective to increase significantly the settling rate of solids suspended in wet process phosphoric acid and similar solutions of acidic inorganic phosphatic materials.

It is an additional important object of the invention to provide a wet process phosphoric acid sufficiently free of suspended solid impurities to be shipped or stored without appreciable precipitation or sedimentation over an extended time period.

It is an additional object of the invention to provide an economic process for the clarification of wet process phosphoric acid.

It is a more specific object of the invention to provide a process which entails the utilization of only nontoxic, noncorrosive, nonfume-forming reagents for the clarification of wet process phosphoric acid.

It is a more specific object of the invention to provide a process for the continuous clarification of concentrated wet process phosphoric acid which is appropriate for installation in a conventional wet process phosphoric acid plant.

Now, in accordance with this invention, it has been discovered that solutions of acidic inorganic phosphates containing suspended solid impurities can efficiently be clarified by agitating said solutions with (a) an organic clarification agent selected from the group consisting of tall oil, soap skimmings, tall oil pitch, the rosin acid fraction of tall oil, the fatty acid fraction of tall oil, the unsaponifiable fraction of tall oil, the aliphatic fatty acids containing from about 10 to about 20 carbon atoms and the alkali metal soaps thereof, the rosin acids and the alkali metal soaps thereof, and mixtures thereof, and (b) an inorganic clarification agent comprising an alkali metal silicate; said clarifying agents (a) and (b) being employed in minor proportions effective to increase the settling rate of said suspended solids; and thereafter maintaining the mixture so produced quiescent to settle at least a substantial portion of said impurities and separating the clarified supernatant solution from said settled impurities. The organic and inorganic clarification agents (a) and (b) may be employed simultaneously and in any desired sequence.

The organic clarification agents generally comprise the fatty and rosin acid materials which are obtained as a by-product in the manufacture of wood pulp, individual fatty and rosin acids, and the alkali metal soaps of such acids. Pulp manufacture conventionally yields a crude by-product known as soap skimmings which comprises the sodium soaps of a combination of rosin acids and fatty acids together with a substantial proportion of unsaponifiable materials. Tall oil is prepared from floating soap by acidulation to provide the corresponding free organic acids. Crude tall oil varies somewhat in composition with an approximate average relative proportion of constituents as follows:

| | Weight percent |
|---|---|
| Fatty acids (oleic, linoleic, linolenic, etc.) | 45–60 |
| Rosin acids (abietic, etc.) | 30–45 |
| Unsaponifiable materials | 4–12 |

Tall oil pitch is a residual or bottoms fraction resulting from the distillation of tall oil and contains the relatively higher molecular weight rosin acid, fatty acid, and unsaponifiable tall oil components in generally the same proportions to each other as tall oil. Soap skimmings, tall oil and tall oil pitch are stable articles of commerce well known to the art. Tall oil pitch is a preferred organic clarification reagent for use in the invention.

The invention additionally contemplates the utilization as organic clarification reagents of individual or essentially pure saturated and unsaturated fatty acids containing from about 10 to about 20 carbon atoms, individual or essentially pure rosin acids, and mixtures thereof. Representative fatty acids and rosin acids which can be employed include lauric, palmitic, myristic, oleic, linoleic, linolenic, stearic, abietic, pimaric, dehydroabietic and hydrogenated abietic acid, and the like.

The alkali metal soaps including specifically the sodium, potassium and lithium soaps of such acids are similarly contemplated for use in the invention. It will be appreciated that such soaps are converted to free acids by reaction with the acidic phosphate solutions processed and hence are fully equivalent reagents for use in the invention.

The organic acid clarification agents are effective to some degree in substantially all proportions such that the relative amounts thereof utilized do not constitute an essential feature of the invention. In general, the rate of clarification or settling of solids varies directly with the amount of organic clarification agent utilized. The practical upper limit of organic clarification agent concentration is determined to a significant extent by economic considerations including reagent cost, cost of separation of precipitated reagent and impurities from the clarified acidic solution and dilution of the solution treated. Normally, organic clarification reagents are employed in a minor proportion requisite to provide from about 1 to about 25 pounds and preferably from about 5 to about 10 pounds of reagent per ton of acidic solution to be clarified.

The alkali metal silicate clarification reagents contemplated by the invention comprise all of the various alkali metal silicates and include specifically the sodium, potassium and lithium silicates which are characterized by an alkali metal oxide to silicon dioxide mol ratio from about 1:1 to about 5:1, and preferably from about 2.75 to about 3.25. Alkali metal silicates are most appropriately utilized in the form of aqueous solutions. While the invention contemplates the utilization of aqueous alkali metal silicate solutions of any desired form, aqueous solutions in which there is present from about 5 to about 10 parts by weight of water for each part by weight of alkali metal silicate present are preferred. Commercial water glass such as 40° water glass appropriately diluted to provide from about two to about four pounds of water per pound of water glass is a preferred form of the alkali metal silicate reagent.

The alkali metal silicate clarification reagents are effective in substantially all proportions, when employed in combination with the organic clarification reagents of the invention; hence, the specific proportions utilized are not essential. In general, however, the rate at which the impurities present in the treated acidic solution settle and the proportion of residual solids remaining in the clarified acid varies directly with the amount of alkali metal silicate utilized and the same general considerations apply in determining an appropriate alkali metal silicate dosage as are appropriate in ascertaining the optimum organic clarification reagent concentration. Normally, from about 4 pounds to about 12 pounds and preferably from 5 pounds to about 7 pounds of alkali metal silicate, calculated as pure alkali metal silicate, are employed per ton of acidic phosphatic solution to be clarified.

As those skilled in the art are well aware, alkali metal silicates may tend to form agglomerates or lumps of gritty siliceous material when mixed with strong acids. Accordingly, conventional expedients to effect uniform dispersion of the alkali metal silicate in the acidic phosphatic solution with the minimum formation of large particles of silicate are appropriately utilized. Such expedients include inter alia, relatively slow addition of the alkali metal silicate reagent to the acidic solution treated accompanied by vigorous agitation.

The process of the invention can be practiced under any desired temperature conditions. The settling rate of the suspended solids and the quantity of solids remaining in the clarified acid are, however, both directly in proportion to the treatment and settling temperature. Accordingly, the practice of the invention at elevated temperatures is preferred. The upper temperature limit is determined primarily by the temperature of decomposition or degradation of the organic clarification reagents utilized which gives rise to the formation of undesired emulsions. Hence, the invention generally contemplates operation at all temperatures at which the organic clarification reagents are stable. Additionally, the temperature at which the clarification process is practiced has some effect upon the alkali metal silicate clarification reagent. Accordingly, the clarification procedure is preferably completed at temperatures within the range of about 120° F. to about 250° F. Substantially higher temperatures tend to speed the degradation of the alkali metal silicate to form lumpy or gritty silica particles, whereas lower temperatures tend to result in the formation of colloidal silica which increases the viscosity in the solution with consequent reduction in the settling rate.

The process of the invention is effected in the clarification of acidic phosphatic solutions in all concentrations, acid phosphate solutions formed by the leaching of phosphate rock may constitute substantially calcium free phosphoric acid, or, depending upon the degree of acidulation, approach monocalcium phosphate solutions characterized by a $CaO/P_2O_5$ mol ratio of about 1:1. The invention is useful in the clarification of all such solutions and more specifically is applicable to acidic phosphatic solutions ranging form phosphorus acid to monocalcium phosphate. The problems which attend the clarification of acidic phosphatic solutions containing in excess of about forty-five percent by weight of monocalcium phosphate is particularly acute and the invention finds important utility in the efficient clarification of such materials.

In some cases it has been determined that conventional commercial flocculating agents, stable in concentrated mineral acids, may advantageously be utilized subsequent to the addition of the clarifying reagents of this invention, to expedite the solids settling rate and yield clarified acidic solutions containing a comparatively smaller amount of residual solid impurities. Flocculating agents suitable for such utilization include polyacrylamides which are sold under the commercial trade name "Separan," guar, and the like. Such commercial flocculating agents are employed in the conventional manner normally in water solution, in about 0.05 to about 2% by weight, in an amount requisite to provide from about 0.05 to about 2 pounds thereof per ton of acidic phosphatic solution treated.

The sludge or solids layer resultant from the clarification of acidic phosphatic solutions in accordance with this invention contains a substantial proportion of $P_2O_5$ and is useful in inter alia, in the manufacture of fertilizers and particularly as a binding agent for the manufacture of granulated phosphatic fertilizers.

The following examples are illustrative of the best mode presently known for the practice of the invention.

EXAMPLE I

Five 2000-gram samples of wet process phosphoric acid having the following analysis are placed in 2000 milliliter graduates of the same type and are employed in the demonstration of the invention:

| | Weight percent |
|---|---|
| $P_2O_5$ | 52.84 |
| F | 1.0 |
| CaO | 1.06 |
| $Fe_2O_3$ | 1.73 |
| $Al_2O_3$ | 2.2 |
| $SO_2$ | 3.4 |

Four of the five samples are clarified pursuant to the invention under the conditions in Table I. The fifth sample is utilized as a control as indicated in the table. Settling rates are determined by measuring the depth of the clarified acid after specified time periods. The samples of clarified acid are withdrawn at like intervals and aged one week for the determination of the percentage of wet solids.

The organic clarification reagent is added first with vigorous agitation with the acid to be clarified and the agitation continued from about 1 to about 30 minutes after the acid addition is completed. The alkali metal silicate is added slowly and with vigorous agitation. In all cases the tests are conducted at a settling temperature of 140° F.

*Table I*

| Test No. | Additive | Additive Conc. Pound Per Ton of Acid | Volume Percent Clarified Acid 24 hours) | Weight Percent Wet Solids in Clarified Acid (24 hours) |
|---|---|---|---|---|
| 1 | None (Control) | 0 | 0 (cloudy) | 14.3 |
| 2 | T.O.P.[1] | 5 | 0 (cloudy) | 10.7 |
| 3 | T.O.P.[1] Sodium Silicate [2] | 5 25 | 82 | 5.9 |
| 4 | T.O.P.[1] Sodium Silicate [2] | 5 40 | 74 | 5.2 |
| 5 | T.O.P.[1] Sodium Silicate [3] Flocculant [4] | 5 50 0.1 | 62 | 1.9 |

[1] Tall oil pitch, a commercial product supplied by the Arizona Chemical Co.
[2] Commercial 40° Baumé water glass, 3.75 SiO₂/Na₂O mol ratio diluted to provide a total of 1.16 pounds of water per pound of water glass.
[3] Commercial 40° Baumé water glass, 3.2 SiO₂/Na₂O mol ratio diluted to provide a total of 1.2 pounds of water per pound of water glass.
[4] A commercial polyacrylamide flocculant sold under the trade name "Separan 2610" added in the form of a 0.1% water solution after addition of T.O.P. and sodium silicate.

Analogous results are obtained when soap skimmings, crude tall oil, the fatty acid fraction of tall oil, the rosin acid fraction of tall oil, the unsaponifiable fraction of tall oil, abietic and/or oleic acid are employed in the same manner as in tests 2, 3, 4, and 5 of Table I. Potassium silicate may be substituted for sodium silicate in like manner.

EXAMPLE II

A test is completed in the same manner as Test 3 of Table I at a temperature of about 200° F. utilizing a similar wet process phosphoric acid. In this example, there is employed a 40° Baumé water glass having an SiO₂/Na₂O mol ratio of 3.2 diluted to the degree requisite to provide nine pounds of water per pound of 40° Baumé water glass. The treated sample after 24 hours reflected 58% by volume of clear acid which contained 2.6% by weight of wet solids.

EXAMPLE III

Example II is repeated with the exception that there is employed 50 pounds per ton of commercial 40° Baumé water glass diluted to an extent requisite to provide four pounds of water per pound of 40° Baumé water glass. The treated sample after 24 hours reflects 67 volume percent of clear acid which contained 1.67% by weight of solids. Analogous results are obtained when lauric acid is used in lieu of tall oil pitch.

EXAMPLE IV

Nine parts by weight of a commercial triple superphosphate are hand mixed with one part by weight of both filtered and unfiltered sludge recovered from the bottom or solids layer formed by clarification of phosphoric acid pursuant to the invention. The mixture is granulated in a laboratory drum granulator and dried at about 110° C. for about one hour. The dried granulated product was comparable in hardness to a competitive granulated triple superphosphate and of similar composition as appears from Table II in which all values reported are percent by weight.

*Table II*

| | $P_2O_5$ | $\frac{Cl}{P_2O_5}$ | F | $Fe_2O_3$ | $Al_2O_3$ | CaO | $SO_4$ |
|---|---|---|---|---|---|---|---|
| Untreated Triple | 48.6 | 0.7 | 2.50 | 2.24 | 1.73 | 20.60 | 2.48 |
| Triple Granulated with Filtered Sludge | 51.8 | 0.4 | 2.34 | 2.69 | 2.33 | 18.38 | 4.60 |
| Triple Granulated with Unfiltered Sludge | 52.2 | 0.6 | 2.10 | 2.57 | 1.98 | 19.44 | 3.30 |
| Competitive Granulated Triple | 46.6 | 2.2 | 2.42 | 1.33 | 1.03 | 23.14 | 3.09 |

EXAMPLE V

A 2000-gram sample of a wet process phosphoric acid similar to that described in Example I and containing 54.74% by weight is prepared. In a separate vessel tall oil pitch from the same source as that employed in Example I is mixed and agitated with 40° Baumé commercial water glass diluted with three parts of water per part of water glass. The tall oil pitch was employed in an amount requisite to provide five pounds thereof per ton of phosphoric acid to be clarified and the water glass was employed in an amount requisite to provide 30 pounds of sodium silicate (3.75 $SiO_2/Na_2O$ mol ratio) per ton of phosphoric acid. The agitated mixture of tall oil pitch and water glass formed an emulsion which was added to the phosphoric acid sample with vigorous agitation while the acid was at a temperature of 180° F. The acid was maintained at approximately 180° F. during a twenty-four hour settling period subsequent to which the treated sample reflected about 85% by volume of clear acid containing not more than about 2% by weight of wet solids.

EXAMPLE VI

The commercial scale application of the invention is reflected in this example.

An initial clarification agent mixture comprising 750 gallons of commercial 40° Baumé sodium silicate, 1600 pounds of tall oil pitch from the same source as that employed in Example I, and 2800 gallons of water is prepared by agitation of the ingredients at about 150° F. The reagent mixture is allowed to stand, with agitation, until required for use in the process and is supplemented by a like formulation as necessary.

Concentrated wet process phosphoric acid containing an average of about 53.5% by weight of $P_2O_5$ and about 19.40% suspended solids is pumped directly at a rate of about 55 to 60 gallons per minute from a commercial concentration while at a temperature of about 180° F. to about 200° F. to a mixing tank provided with an agitator.

The clarification mixture is continuously added to the mixing tank near the agitator at a rate of about three and one-half to about four gallons per minute. The mixture of acid and clarification agents is then passed into a second compartment and thence into an overflow outlet to a pump which pumps the mixture into a baffled launder leading to a settling tank. A 0.2% by weight water solution of a commercial flocculant, Separan 2610, is added to the mixture in the launder at the rate of about 1.5 to 2 gallons per minute. The treated acid settles at the rate of about twelve inches per twenty-four hours and a clarified product was available in sufficient quantity for shipment after three days; however, no clarified product is removed until after a one week settling period during which the acid temperature dropped from about 180° F. to about 135° F. to 140° F. At the end of one week, a tank car is loaded with the clarified acid product containing about 2% by weight of suspended solids. The balance of the treated acid is maintained in the settling tank for a second week and a second tank car is then filled with the clarified acid product which contained about 0.2% by weight suspended solids when the car was loaded.

The invention, as illustrated by the foregoing examples, affords an efficient and economical method for the rapid clarification of wet process acidic phosphatic solutions. The reagents utilized are nontoxic, nonfume forming and inexpensive. The clarified product is of good quality and the sludge or solids material formed finds utility in the fertilizer industry. The invention accordingly represents a significant contribution to the art.

I claim:

1. The process for the clarification of an acidic inorganic phosphate solution containing suspended solid impurities which comprises agitating said solution with (a) an organic clarification agent selected from the group consisting of tall oil, soap skimmings, tall oil pitch, the rosin acid fraction of tall oil, the fatty acid fraction of tall oil, the unsaponificable fraction of tall oil, the aliphatic fatty acids containing from about 10 to about 20 carbon atoms and the alkali metal soaps thereof, the rosin acids and the alkali metal soaps thereof, and mixtures thereof, and (b) an inorganic clarification agent comprising an alkali metal silicate; said clarifying agents (a) and (b) being employed in minor proportions effective to increase the settling rate of said suspended solids; and thereafter maintaining the mixture so produced quiescent to settle at least a substantial portion of said impurities and separating the clarified supernatant solution from said settled impurities.

2. The process of claim 1 wherein the acidic phosphate solution is obtained by the aqueous leaching of acidulated phosphate rock.

3. The process of claim 1 wherein the acidic phosphate solution is wet process phosphoric acid.

4. The process of claim 3 wherein the wet process phosphoric acid contains at least about forty-five percent by weight of phosphorus pentoxide.

5. The process of claim 1 wherein said organic clarification agent comprises tall oil pitch and wherein said inorganic clarification agent is sodium silicate.

6. The process of claim 5 wherein the acidic phosphatic solution is wet process phosphoric acid.

7. The process of claim 6 wherein said tall oil pitch is employed in an amount requisite to provide from about one to about twenty-five pounds thereof per ton of wet process phosphoric acid treated.

8. The process of claim 7 wherein said sodium silicate is employed in an amount requisite to provide from about four to about twelve pounds thereof per ton of wet process phosphoric acid.

9. The process of claim 6 wherein said sodium silicate is employed in an amount requisite to provide from about four to about twelve pounds thereof per ton of wet process phosphoric acid.

10. The process of claim 6 wherein said sodium silicate is employed in the form of an aqueous solution containing from about five to about ten parts by weight of water for each part of weight of said silicate.

11. The process of claim 1 wherein a flocculant is added subsequent to the agitation of the acidic phosphate solution with clarification agents (a) and (b).

12. The process of claim 1 wherein said organic clarification reagent (a) comprises the rosin acid fraction of tall oil.

13. The process of claim 1 wherein said organic clarification reagent (a) comprises the fatty acid fraction of tall oil.

14. The process of claim 1 wherein said inorganic clarification reagent (b) comprises sodium silicate having a sodium oxide to silicon dioxide mol ratio of from about 1:1 to about 5:1.

References Cited in the file of this patent

UNITED STATES PATENTS 1,547,732     Broadbridge et al. _____ July 28, 1925

OTHER REFERENCES

Gaudin: "Flotation," 2nd Ed., copyright February 19, 1957, McGraw-Hill, N.Y., pages 123, 185, 186 and 188 relied upon.